April 19, 1960 H. V. NUTTALL 2,933,617

MAGNETIC AMPLIFIER CIRCUIT

Filed May 25, 1956 2 Sheets-Sheet 1

HUBERT V. NUTTALL,
INVENTOR

BY [signature]

ATTORNEY

April 19, 1960 H. V. NUTTALL 2,933,617
MAGNETIC AMPLIFIER CIRCUIT
Filed May 25, 1956 2 Sheets-Sheet 2
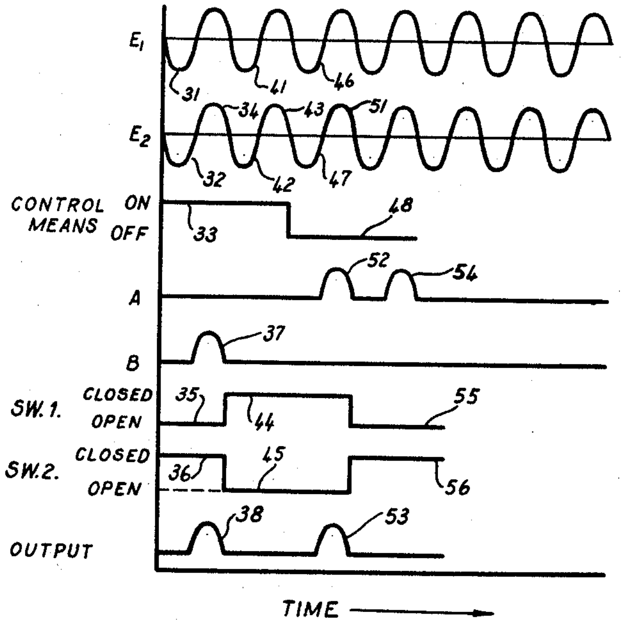
Fig. 3
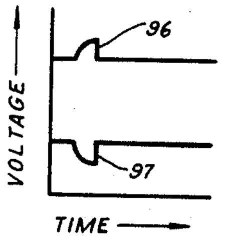
Fig. 8.
| | LIGHT | SW. 1 | SW. 2 | OUTPUT 1 | OUTPUT 2 |
|---|---|---|---|---|---|
| 1 | ON | OPEN | CLOSE | NO | YES |
| 2 | ON | CLOSE | OPEN | YES | YES |
| 3 | OFF | CLOSE | OPEN | YES | NO |
| 4 | OFF | OPEN | CLOSE | YES | YES |
Fig. 6.
| | CONTROL MEANS | SW. 1 | SW. 2 | OUTPUT |
|---|---|---|---|---|
| 1 | ON | OPEN | CLOSE | YES |
| 2 | ON | CLOSE | OPEN | NO |
| 3 | OFF | CLOSE | OPEN | YES |
| 4 | OFF | OPEN | CLOSE | NO |
Fig. 4.
HUBERT V. NUTTALL,
INVENTOR
BY [signature]
ATTORNEY 2,933,617

MAGNETIC AMPLIFIER CIRCUIT

Hubert V. Nuttall, Culver City, Calif., assignor to Hughes Aircraft Company, Culver City, Calif., a corporation of Delaware Application May 25, 1956, Serial No. 587,333

7 Claims. (Cl. 307—88)

This invention relates generally to magnetic amplifiers and more particularly to circuit utilizing one saturable magnetic core for producing output signals upon the occurrence of a predetermined relationship between applied control signals and programed signals.

In the digital computer art and particularly where such computers are used in the automation field it becomes necessary in many instances to compare signals. For example position indicating signals taken from a carriage or other movable device holding a work piece must be compared with signals from a programer. In performing this function the two signals are brought together, compared, and output signals produced depending upon a predetermined relationship between the two signals. In the past this function has been performed with vacuum tube circuits.

While in general circuits employing vacuum tubes are quite reliable they have a number of disadvantages, the most obvious of these is that inasmuch as vacuum tubes are employed such tubes are subject to normal failure. Further, they are of relatively fragile construction and may present a serious problem in maintenance of a relatively large system. Furthermore, due to the relatively large size of these tubes they cannot be packaged within the desired small space allotted for the over-all system.

One means of alleviating these disadvantages is by the use of magnetic amplifiers. Such devices for use in some applications have been disclosed and claimed in copending applications of Hubert V. Nuttall and John E. Richardson, Serial No. 574,526, filed March 28, 1956, now abandoned, on "On-Off Magnetic Amplifier Control," and Serial No. 583,577, filed May 8, 1956, now Patent No. 2,896,091, on "Magnetic Amplifier Digital Comparison Circuit," and both assigned to the assignee of this application. While the circuits as therein disclosed and claimed perform quite adequately in virtually all applications it sometimes becomes necessary due to space limitations to reduce the number of components necessary while still performing the same functions.

Accordingly it is an object of the present invention to provide a circuit for comparing a programed signal with a control signal and for producing output signals during a predetermined relationship between said programed and control signals.

Another object of the present invention is to provide a circuit for detecting the position of a movable element and for comparing the detected position with a programed position which utilizes magnetic amplifiers.

Still another object of the present invention is to provide a magnetic amplifier circuit for detecting the position of a movable element and for comparing the detected position with a programed position which utilizes only one saturable magnetic core.

A circuit in accordance with the present invention for performing the desired functions includes a magnetic amplifier having input and output circuits. The output circuits are adapted to produce first and second intermediate signals, the second signal being the complement of the first. Control signals are applied to the input circuit for controlling production of the first and second intermediate signals. Connected to the output circuit is means for comparing the first and second intermediate signals with signals from a programer. Upon the occurrence of a predetermined relationship between the intermediate and programed signals an output signal is produced.

The novel features of the present invention are set forth in particularity in the appended claims. Other and more specific objects of the invention will become apparent from a consideration of the following description taken in connection with the accompanying drawings illustrating preferred embodiments of the present invention in which:

Fig. 3 is a graph illustrating waveforms taken at various points throughout the circuit of Fig. 1;

Fig. 4 is a chart illustrating the relationships between components and signals of the circuit of Fig. 1;

Fig. 6 is a chart illustrating the relationships between components and signals of the circuit of Fig. 5;

Fig. 8 is a graph illustrating waveforms illustrative of the use of the circuit of Fig. 7.

Figure 1:
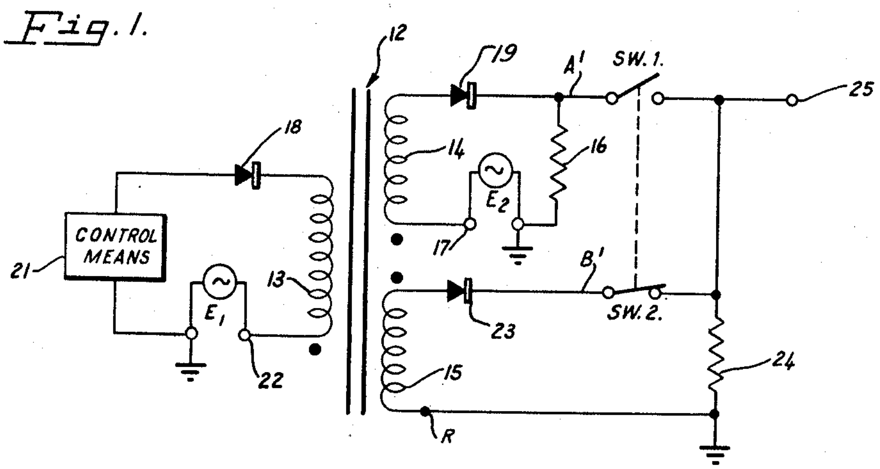
Fig. 1 is a schematic circuit diagram of one embodiment of a magnetic amplifier circuit of the present invention.

Referring now to the drawings and more particularly to Fig. 1 there is shown a magnetic amplifier in accordance with the present invention which includes a saturable magnetic core 12. Wound upon the core are windings 13, 14 and 15. Sources of potential as indicated by $E_1$ and $E_2$ are applied to terminals 22 and 17 of windings 13 and 14 respectively. These sources of potential cause the flux state within core 12 to change from one state to another as will hereinafter be explained. A unidirectional current flow device such as a semiconductor diode 19 is connected to one terminal of winding 14. Connected between the cathode of diode 19 at point A′ and ground is a load impedance device such as resistor 16. Switching means as indicated by $SW_1$ is connected between the cathode of diode 19 and output terminal 25. Another undirectional current flow device such as a semiconductor diode 23 is connected to one terminal of winding 15, the other terminal, point R, being connected to ground. The input circuit to this magnetic amplifier includes the source of potential $E_1$, the winding 13 and the diode 18. As is shown, this magnetic amplifier is provided with two output circuits, one of which includes the source of potential $E_2$, the winding 14, the diode 19 and the resistor 16. The other output circuit includes the winding 15 and the diode 23. Connected between the cathode of diode 23 and output terminal 25 is another switching means designated by $SW_2$. It will be noted that each of the switching means $SW_1$ and $SW_2$ is ganged to the other as indicated by the dotted connecting line so that when one is closed the other is open.

The switching means, $SW_1$ and $SW_2$, is the program position indicating means and is represented as mechanical switches for the purposes of clarity and discussion only. The position of the switching means may be either the programed signal itself or the switching means may be actuated in response to the programed signal. It is to be expressly understood that any means which will perform the function of switching such as, for example, photocells or transistor switching circuits may be utilized instead of the mechanical switches as shown.

Another unidirectional current flow device such as diode 18 is connected to one terminal of winding 13. Connected between the anode of diode 18 and ground is a control means which is indicated by rectangle 21. Control means 21 is the position indicating device. An impedance element such as resistor 24 is connected between output terminal 25 and ground.

Figures 2, 5, 7:
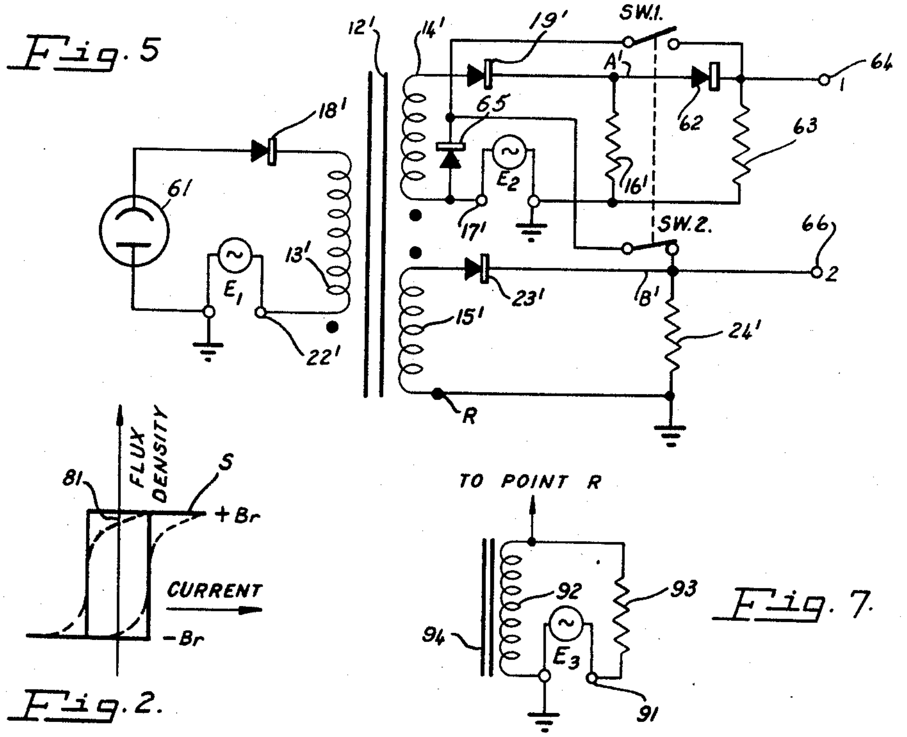
Fig. 2 is a graph illustrating characteristic curves of types of magnetic cores which may be utilized in the magnetic amplifier circuit of the present invention.
Fig. 5 is a schematic circuit diagram of another embodiment of the magnetic amplifier circuit of the present invention.
Fig. 7 is a schematic circuit diagram of an additional circuit which may under some circumstances be utilized with the circuits of Fig. 1 and Fig. 5.

Referring now to Fig. 2 and more particularly to the solid line curve thereof which illustrates the characteristic of a magnetic core having a substantially rectangular hysteresis loop and in which the abscissa represents current and the ordinate flux density, it will be noted that a core having a characteristic of this type has two flux levels or states of remanence shown as $+B_r$ and $-B_r$ on Fig. 2. The solid line hysteresis loop as shown in Fig. 2 will be used in most instances throughout this application for purposes of clarity and discussion only. It is to be expressly understood that magnetic cores having other hysteresis loops such as that shown by the dashed portion of Fig. 2 may be used without departing from the spirit or scope of this invention.

It is well known in the prior art that if a current of proper polarity is passed through a winding which has been wound upon a saturable magnetic core and at the same time voltage is maintained across the winding for a given period of time the phenomenon occurs in which the flux state of the core may be caused to change from $+B_r$ to $-B_r$ or from $-B_r$ to $+B_r$ as the case may be. An extensive discussion of this phenomenon including the pertinent mathematics may be found in Patent 2,719,885, issued to R. A. Ramey, Jr., October 4, 1955, and filed July 20, 1951. It is this phenomenon upon which the magnetic amplifier is based.

In discussing the operation of the circuit in Fig. 1 reference is now made to Fig. 3 wherein the abscissa represents time and the ordinate represents either voltage or the state of one of the components of Fig. 1 as designated thereon. Curves $E_1$ and $E_2$ were taken by measuring between terminals 22 and 17 respectively and ground. Curve A was taken by measuring across resistor 16 as indicated by point A′ on Fig. 1. Curve B was taken by measuring across winding 15 as indicated at B′. The output waveform was taken by measuring between terminal 25 and ground. The remainder of the curves indicate conditions of the control means 21 and the switching means, $SW_1$ and $SW_2$, as thereon indicated.

Before discussion of the operation of the circuit of Fig. 1 it will first be assumed that periodically recurring waves of voltage such as shown at $E_1$ and $E_2$ on Fig. 3 are applied to terminals 22 and 17 respectively of Fig. 1. The windings upon core 12 are wound in such a manner as to cause the polarity of voltages appearing thereacross to be as indicated by the polarity markings. If current enters an unmarked terminal of one of the windings 13 and 14 the flux within core 12 will be caused to reset, that is, go from $+B_r$ to $-B_r$ whereas if current is allowed to enter a polarity marked terminal of one of the windings 13 and 14 the flux within core 12 is caused to read out, that is, go from $-B_r$ to $+B_r$. It is to be assumed further that windings 13 and 14 have enough turns to just support the voltage which is applied by sources of potential $E_1$ and $E_2$ if the flux level of core 12 is to change by $2B_r$. One further assumption is that core 12 is initially in its $+B_r$ state.

Assuming as a first example of operation that $SW_1$ is open and $SW_2$ is closed as shown on Fig. 1 and further that sources of potential $E_1$ and $E_2$ are negative as shown at 31 and 32 in Fig. 3 this causes terminals 22 and 17 to be negative with respect to ground. It is also assumed that control means 21 is on as shown at 33 in Fig. 3. In this state current may flow through winding 13. While this state exists diode 19 will be back-biased and diode 18 forward-biased. Since diode 18 is forward-biased and control means 21 is on, current flows through winding 13 entering an unmarked terminal thereof. This causes core 12 to reset as hereinabove described. On the next succeeding half cycle 34 of $E_2$ diode 19 is forward-biased and current flows through winding 14 entering a marked terminal. This causes the flux within core 12 to read out. Since core 12 reads out the voltage presented by source $E_2$ will appear across winding 14 thus causing substantially zero voltage to appear across load resistor 16.

Due to the normal transformer action which occurs between windings upon the same core, voltage is induced in winding 15 due to the change in flux within core 12 as a result of the current flowing through winding 14. This induced voltage or intermediate signal is positive at the polarity marking of winding 15. This causes diode 23 to be forward-biased and since it is seen that $SW_2$ is now closed as indicated at 36 on Fig. 3 current flows through winding 15 causing a voltage drop across resistor 24. This is indicated by pulse 37 on Fig. 3. Since output terminal 25 is connected to resistor 24 the signal developed across this resistor also appears as an output signal as represented by pulse 38 on Fig. 3. This is indicated at line 1 on Fig. 4.

If during succeeding negative half cycles 41 and 42 of $E_1$ and $E_2$ respectively control means 21 remains on as indicated at 33, current once more flows in winding 13 causing core 12 to reset. On the succeeding positive half cycle 43 of $E_2$ current again flows through winding 14 causing core 12 to read out. Due to the transformer action hereinabove discussed current tends to flow through winding 15. However, since $SW_1$ and $SW_2$ have now changed their positions due to programing changes as indicated at 44 and 45 current is unable to flow through winding 15. Therefore during this half cycle no signal appears at output terminal 25. This is further represented by line 2 of Fig. 4.

Referring now to negative half cycles 46 and 47 of $E_1$ and $E_2$ respectively it will be assumed that the condition of control means 21 has changed so that it is now off as indicated at 48. Since this is the case no current can flow through winding 13 and therefore core 12 will not reset but instead remains at its $+B_r$ state. On the succeeding positive half cycle 51 of $E_2$ current flows through winding 14 and since core 12 was not reset the flux state therein moves to its point of saturation S shown on Fig. 2 and the voltage presented by $E_2$ will appear across load resistor 16 as indicated by 52 on curve A. Since $SW_1$ is now closed this signal appears at output terminal 25 as indicated at 53 on Fig. 3. This is further indicated by line 3 on chart 4.

If during the successive negative and positive half cycles of $E_1$ and $E_2$ the control means remains in its off position as indicated another signal will appear at A′ as indicated at 54. However, since $SW_1$ and $SW_2$ have once more reversed their positions as shown at 55 and 56 no output signal will appear at terminal 25. This is further represented by line 4 of Fig. 4.

It is, therefore, seen by reference to the curves of Fig. 3 or the chart of Fig. 4 that during certain predetermined relationships between the control means and the switching means an output signal will be produced at terminal 25. It is further seen in view of the foregoing discussion that the intermediate signals appearing at points A′ and B′ are complementary signals.

Referring now more particularly to Fig. 5 there is shown an alternative preferred embodiment of the invention. The components of the circuit in Fig. 5 in most instances are identical to those represented in Fig. 1 as indicated by the use of the same reference characters primed. However, control means 21 has been replaced with photocell 61. An additional circuit including diode 62 and resistor 63 is connected in parallel with load resistor 16′. Output terminal 64 is connected to the cathode of diode 62. An additional diode 65 is connected to terminal 17′. In this embodiment the magnetic amplifier is again provided with an input circuit which includes the source of potential $E_1$, the winding 13′ and the diode 18′. Two output circuits are also provided, one of which includes the source of potential $E_2$, the winding 14′, the diodes 65, 19′ and the resistor 16′. The other output circuit includes the winding 15′, the diode 23′ and the resistor 24′. One terminal of switching means $SW_1$ and $SW_2$ is returned to the anode of diode 65 while the other terminal of each of the switching means is connected to output terminals 64 and 66 respectively. This connection of the switching means is utilized in order to alleviate the necessity of wiring both contacts of the switches individually into each of a number of circuits which may be utilized within an entire system. By use of this connection a common terminal of all switches which may be utilized within the entire system for the purpose of programing may be commonly connected and returned through a diode such as 65 to source of potential $E_2$. It will be further noted that $SW_2$ is no longer connected in series with winding 15 as was the case in Fig. 1.

In discussing the operation of the circuit as shown in Fig. 5 reference will be made only to the chart of Fig. 6. The waveforms appearing at various points throughout the circuit of Fig. 5 will be similar to those discussed above with reference to Fig. 3.

Assume as a first example of operation that $SW_1$ is open and $SW_2$ is closed as shown in Fig. 5 and that light is incident upon photocell 61 as indicated on line 1 of Fig. 6. During successive half cycles of sources of potential $E_1$ and $E_2$ respectively core 12 first resets and then reads out as hereinabove described. During the read-out half cycle of $E_2$ the following events occur. Through the transformer action hereinabove described a signal is induced in winding 15′ causing diode 23′ to be forward-biased and a signal to be developed across resistor 24′. At this same time diode 65 is forward-biased and current flows therethrough and also through switch $SW_2$ and resistor 24′. It is, therefore, seen that a signal will be produced across resistor 24′ from two sources, winding 15′ and potential $E_2$ and appears at output terminal 66. Since during this time no voltage is developed across resistor 16′ and $SW_1$ is open, no output signal will appear at terminal 64.

Maintaining light incident upon photocell 61 it is now assumed that $SW_1$ and $SW_2$ are reversed as indicated on line 2, Fig. 6 and that core 12 resets and then reads out. If this be the case the following events will occur. Again transformer action will cause a signal to be developed across resistor 24′ from winding 15′. Since $SW_2$ is now open $E_2$ is removed as a source from resistor 24′. However since $SW_1$ is now closed and diode 65 is forward-biased as before, current will flow through resistor 63 causing an output signal to be produced thereacross even though no signal is produced across resistor 16′. Therefore, it is seen that output signals during this state appear at terminals 64 and 66 as represented on line 2 of Fig. 6.

Now maintaining $SW_1$ and $SW_2$ in their present positions and removing the light from photocell 61 it will be seen that no current flows through winding 13′ and core 12′ is not allowed to reset. Therefore, on the following half cycle core 12′ saturates only and a signal is produced across resistor 16′ appearing at point A′. Since core 12′ does not change states no signal will be produced in winding 15′ at this time. The signal appearing at A′ forward-biases diode 62 and causes an output signal to appear at terminal 64. At the same time, since $SW_1$ is closed and diode 65 is forward-biased, an output signal is produced across resistor 63. So during this state output terminal 64 has two sources of signals. Since $SW_2$ is open no current flows from source $E_2$ through resistor 24′ and therefore no signal is produced across it. Since no transformer action occurs, no voltage appears across winding 15′ and this source of signals is also nonexistent. Therefore an output signal appears at terminal 64 but not at terminal 66. This is further indicated by line 3 of Fig. 6.

If switches $SW_1$ and $SW_2$ are now reversed so that they occupy the position as shown on Fig. 5 and no light is allowed to fall on photocell 61 the following events occur: again core 12′ does not reset but only goes to saturation during the positive half cycle of $E_2$. Since this occurs, an output signal is developed at A′ which forward-biases diode 62 causing a signal to appear at terminal 64. Since diode 65 is forward-biased and $SW_2$ is closed a signal is developed across resistor 24′ even though no transformer action is present at this time. Therefore, during this state output signals appear at terminals 64 and 66. This is further indicated by line 4 of Fig. 6. The signals appearing at terminals 64 and 66 may be applied to either logical "and" or logical "or" gates, or both, for desired computation.

In some applications it will be undesirable to use magnetic cores having the rectangular hysteresis loop as hereinabove indicated. In such instances the hysteresis loop may be of the type indicated by the dashed portion appearing on Fig. 2. If this be the case when the operation of the circuit is such that the magnetic core saturates, undesirable output signals will be produced. This results from the movement of the flux from point 81 to point S on the dashed hysteresis loop. This movement causes a small signal to be developed in winding 15 or winding 15′ whichever the case may be as indicated at 96 on Fig. 8. In order to overcome this the circuit as shown in Fig. 7 to which reference is now made may be utilized in the following manner: the terminals of winding 15 or winding 15′ which are marked with the symbol R may be disconnected from ground and connected to the arrow as indicated on Fig. 7. When this is done and a source of potential is applied to terminal 91 of Fig. 7 a voltage will be developed across winding 92. Core 94 is designed so that it saturates when voltage $E_3$ applied to winding 92 is of the same amplitude as the voltage developed across winding 14 when core 12 moves from point 81 to saturation S. This voltage as shown at 97 on Fig. 8 is such as to cancel that voltage developed in winding 15 or 15′. Resistor 93 is utilized as a current limiting resistor.

Either of the preferred embodiments of the invention as above described may be incorporated into a system and there utilized to perform the functions of detecting the position of a controlled object and comparing this position with programed information designating the desired position of the object. In response to a predetermined relationship between the detection signals and the programed signals output signals are produced for causing the controlled object to position itself in accordance with the program.

There have been thus discussed two preferred embodiments of a magnetic amplifier detection and comparison circuit which utilizes only a single saturable magnetic core and which dispenses with the use of vacuum tubes for performing the desired functions above referred to.

What is claimed is:

1. A magnetic amplifier circuit for producing output signals upon the occurrence of a predetermined relationship between applied control signals and programed signals, said circuit comprising: a saturable magnetic core; first, second and third windings on said core; first and second sources of energizing potential connected serially to said first and second windings respectively for alternately changing the state of flux within said core; control signal means connected to said first winding for controlling the flux change within said core, said second and third windings being adapted to produce first and second intermediate signals respectively in response to application of said control signals to said first winding, the second intermediate signal being the complement of the first intermediate signal; means for providing programed signals; and means responsive to said programed signals and connected to said second and third windings for gating said intermediate signals to an output terminal, whereby an output signal is produced during the predetermined relationship between said intermediate signals and said programed signals.

2. A circuit for producing output signals upon the occurrence of a predetermined relationship between applied control signals and programed signals, said circuit comprising: a magnetic amplifier including a saturable magnetic core having first and second windings thereon; first and second sources of potential coupled to said first and second windings, respectively, for changing the flux state within said core; control means coupled to said first winding for controlling the flux state change, whereby a first intermediate signal is produced during the time said control means prevents said first source from changing the flux state of said core; a third winding upon said core; a unidirectional current flow device connected to said third winding, whereby a second intermediate signal is induced in said third winding only when the flux within said core is caused to change by said second source of potential, said second intermediate signal being a complement of said first intermediate signal; and switching means coupled to said second and third windings for comparing said intermediate signals with said programed signal, whereby an output signal is produced during the time a predetermined relationship exists between said intermediate and programed signals.

3. A circuit for producing output signals upon the occurrence of a predetermined relationship between applied control signals and programed signals, said circuit comprising: a magnetic amplifier including a saturable magnetic core having first and second windings thereon; first and second sources of potential coupled to said first and second windings, respectively, for changing the flux state within said core; control means coupled to said first winding for controlling the flux state change within said core, whereby a first intermediate signal is produced during the time said control means prevents said first source from changing the flux state of said core; first output signal producing means coupled to said second winding; a third winding upon said core; a first unidirectonal current flow device and a second output signal producing means connected in series between the terminals of said third winding, whereby a second intermediate signal is induced in said third winding only when the flux within said core is caused to change by said second source said second signal being the complement of said first signal; first and second switching means connected individually to said first and second output signal producing means respectively; and a second unidirectional current flow device connected between said second source of potential and a common junction point between said first and second switching means.

4. The circuit as defined in claim 3 wherein said switching means are ganged and are arranged so that when said first switching means is open said second switching means is closed.

5. The circuit as defined in claim 3 wherein said first output signal producing means includes a first diode connected to said second winding, a first resistor connected between said first diode and said second source of potential, and a second diode and second resistor connected in series across said first resistor.

6. A circuit for producing output signals upon the occurrence of a predetermined relationship between applied control signals and program signals, said circuit comprising: a magnetic amplifier including a saturable magnetic core having a first and second winding thereon; first and second sources of periodically recurring potential coupled to said first and second windings respectively, said second winding having first and second terminals, said first terminal being connected to said second source of potential; a photocell and a first unidirectional current flow device connected in series with said first winding and said first source of potential; a second unidirectional current flow device and a first load impedance element connected in series between said second terminal and said second source of potential; a third winding upon said core, said second and third windings being adapted to develop complementary signals; a third unidirectional current flow device and a second load impedance element connected in series relation across said third winding; a fourth unidirectional current flow device and a third load impedance element connected in series relationship across said first load impedance element; a fifth unidirectional current flow device and a first switching means connected in series relationship between said second terminal and the junction between said fourth unidirectional current flow device and said third load impedance element; and a second switching means connected between the junction of said fifth unidirectional current flow device and said first switching means and the junction between said third unidirectional current flow device and said second load impedance element, said first and second switching means being ganged and arranged so that during the time said first switching means is open said second switching means is closed.

7. A circuit for producing output signals upon the occurrence of a predetermined relationship between applied control signals and programed signals, said circuit comprising: a magnetic amplifier including a saturable magnetic core having first and second windings thereon; first and second sources of periodically recurring potential coupled to said first and second windings, respectively; control means including a first unidirectional current flow device connected in series between said first winding and said first source of potential for controlling the flux change within said core; a second unidirectional current flow device and a first load impedance element connected in series between said second winding and second source of potential thereby to produce a first intermediate signal during intervals when said control means prevents a change in the flux state within said core; first switching means connected to a common junction between said first load impedance element and said second unidirectional current flow device; a third winding upon said core; a third unidirectional current flow device connected to said third winding; and second switching means and a second load impedance element connected in series between said third unidirectional current flow device and said third winding thereby to produce a second intermediate signal during intervals when said control means allows said first and second sources of potential to change the flux state within said core, said second intermediate signal being the complement of said first signal and said first and second switching means being interlocked so that during the time said first switching means is open said second switching means is closed.

References Cited in the file of this patent

UNITED STATES PATENTS

| | | |
|---|---|---|
| 2,169,093 | Edwards | Aug. 8, 1939 |
| 2,709,225 | Pressman | May 24, 1955 |
| 2,770,737 | Ramey | Nov. 13, 1956 |